(12) United States Patent
Salerno et al.

(10) Patent No.: US 10,494,127 B2
(45) Date of Patent: Dec. 3, 2019

(54) LIQUID DISPENSING SYSTEM

(71) Applicant: Sealed Air Corporation (US), Charlotte, NC (US)

(72) Inventors: Mark H. Salerno, Stratford, CT (US); Jessica L. Denson, Fort Mill, SC (US)

(73) Assignee: Sealed Air Corporation (US), Charlotte, NC (US)

( * ) Notice: Subject to any disclaimer, the term of this patent is extended or adjusted under 35 U.S.C. 154(b) by 0 days.

(21) Appl. No.: 15/765,087

(22) PCT Filed: Oct. 6, 2016

(86) PCT No.: PCT/US2016/055614
§ 371 (c)(1),
(2) Date: Mar. 30, 2018

(87) PCT Pub. No.: WO2017/066062
PCT Pub. Date: Apr. 20, 2017

(65) Prior Publication Data
US 2018/0273223 A1  Sep. 27, 2018

Related U.S. Application Data

(60) Provisional application No. 62/240,207, filed on Oct. 12, 2015.

(51) Int. Cl.
*B65B 37/06* (2006.01)
*B29K 75/00* (2006.01)
(Continued)

(52) U.S. Cl.
CPC ............ *B65B 37/06* (2013.01); *B29B 7/7433* (2013.01); *B29C 44/18* (2013.01); *B29K 2075/00* (2013.01); *B29L 2031/58* (2013.01)

(58) Field of Classification Search
CPC ....... B65D 37/06; B29B 7/7433; B29C 44/18; B29K 2075/00; B29L 2031/58
See application file for complete search history.

(56) References Cited

U.S. PATENT DOCUMENTS 3,756,233 A * 9/1973 Goldowsky .......... A61M 5/1411
  604/254
5,727,370 A * 3/1998 Sperry .................. B29C 44/182
  53/122

(Continued)

FOREIGN PATENT DOCUMENTS

GB  2079863 A *  1/1982  .......... B05B 11/007
GB  2079863 A     1/1982
(Continued)

OTHER PUBLICATIONS

Written Opinion of the International Searching Authority, dated Apr. 20, 2017, in PCT/US2016/055614.

*Primary Examiner* — Jeremy Carroll
(74) *Attorney, Agent, or Firm* — Jon M. Isaacson (57) ABSTRACT

A system for dispensing a liquid includes a source (24) of a liquid that crystallizes upon exposure to water moisture in air (e.g., an isocyanate). A dispenser (58) includes an inlet conduit (62) for receiving the liquid from the source, an outlet conduit (72) for dispensing the liquid out of an outlet opening exposed to air, and a valve (66) between the inlet (62) and outlet conduits (72). In the closed position of the valve (i) an upstream portion of the liquid is retained in the inlet conduit (62) on the upstream side of the valve (66) and (ii) a downstream portion of the liquid extending from the downstream side of the valve to the outlet opening is retained in the outlet conduit (72) on the downstream side of the valve (66). The size of the outlet opening of the outlet (Continued)

conduit (72) is sufficiently small to retain the downstream portion of the liquid in the outlet conduit when the valve (66) is in the closed position.

20 Claims, 10 Drawing Sheets

(51) Int. Cl.
  *B29B 7/74* (2006.01)
  *B29C 44/18* (2006.01)
  *B29L 31/58* (2006.01)

(56) References Cited

U.S. PATENT DOCUMENTS

| | | | |
|---|---|---|---|
| 5,909,846 A | | 6/1999 | Sasaki |
| 6,481,645 B1 * | | 11/2002 | Taylor-McCune ........ B05B 1/28 |
| | | | 222/144.5 |
| 7,735,685 B2 * | | 6/2010 | Bertram ................ B29B 7/7678 |
| | | | 222/135 |
| 2012/0261028 A1 * | | 10/2012 | Gray ................... B01F 3/04446 |
| | | | 141/9 |

FOREIGN PATENT DOCUMENTS

| | | |
|---|---|---|
| GB | 2365804 A | 2/2002 |
| JP | 2001096197 A | 4/2001 |

\* cited by examiner

LIQUID DISPENSING SYSTEM

This application claims the benefit of U.S. Provisional Application No. 62/240,207 filed Oct. 12, 2015, which is incorporated herein in its entirety by reference.

The presently disclosed subject matter relates to a liquid dispensing system, for example, useful in dispensing liquid foam precursors.

BACKGROUND

Polyurethane foam may be formed by mixing an isocyanate compound with a hydroxyl-containing material, such as a polyol (i.e., a compound that contains multiple hydroxyl groups), typically in the presence of water and a catalyst. As the isocyanate and polyol foam precursors react to form polyurethane, the water reacts with isocyanate to produce carbon dioxide gas, which acts as a blowing or foaming agent to expand the polyurethane into a foamed cellular structure (i.e., a polyurethane foam).

With foam-in-bag packaging, the foam precursors may be mixed and dispensed into flexible plastic bags, for example, as the bags are formed from plastic film. As the precursors react to form expanding foam within the bag, the bag may be sealed closed. The bag may then be placed into a box holding an object to be cushioned. The foam tends to expand within the bag into the available space inside the box to form custom foam cushions around the packaged object. Machines for producing foam-in-bag cushions are described, for example, in U.S. Pat. Nos. 4,800,708; 4,854,109; 5,376,219; 5,727,370; 6,003,288; 6,550,229; 6,675,557; and U.S. Patent Application Publication No. 2012/0261028 A1 published 18 Oct. 2012 (U.S. Ser. No. 13/497,152), each of which is incorporated herein in its entirety by reference.

The liquid isocyanate foam precursor and similar compounds can crystallize upon exposure to the water moisture contained in air. This can cause a problem in the transition points within a system that transports and dispenses the liquid isocyanate foam precursor, where the liquid may be exposed to air. For example, when dispensing liquid isocyanate into a bag, a valve may be the transition point for the liquid isocyanate foam precursor from an enclosed environment (e.g., a storage bottle and/or a pump) into contact with air. If the transition point is the seat of a valve, then the crystallized material may collect at the valve seat to disrupt the valve performance, and may cause the need for cleaning the crystallized material from the valve seat. The cleaning process itself may damage the valve. While a solvent (e.g., tri(propylene glycol) methyl ether) may be used to clean the crystallized precursor from the valve, the use of such a solvent requires additional capital expenditure and/or additional processing steps, and may not remove all the crystallized material.

SUMMARY

One or more embodiments of the presently disclosed subject matter may address one or more of the aforementioned problems.

A system for dispensing a liquid includes a source of a liquid that crystallizes upon exposure to water moisture in air and a dispenser in liquid communication with the source. The dispenser includes an inlet conduit for receiving the liquid from the source and an outlet conduit for dispensing the liquid. The outlet conduit terminates in an outlet opening exposed to air. The dispenser also includes a valve between the inlet and outlet conduits. The valve has an upstream side adjacent the inlet conduit and a downstream side adjacent the outlet conduit. The valve is moveable between an open position, in which the liquid flows through the valve, and a closed position, in which the liquid is blocked from flowing through the valve. In the open position of the valve, the liquid flows from the inlet conduit and out the outlet opening of the outlet conduit. In the closed position of the valve (i) an upstream portion of the liquid is retained in the inlet conduit on the upstream side of the valve and (ii) a downstream portion of the liquid extending from the downstream side of the valve to the outlet opening is retained in the outlet conduit on the downstream side of the valve. The size of the outlet opening of the outlet conduit is sufficiently small to retain the downstream portion of the liquid in the outlet conduit when the valve is in the closed position, in which case the valve is immersed in the liquid and the liquid does not drip from the outlet conduit.

These and other objects, advantages, and features of the presently disclosed subject matter will be more readily understood and appreciated by reference to the detailed description and the drawings.

Various aspects of the subject matter disclosed herein are described with reference to the drawings. For purposes of simplicity, like numerals may be used to refer to like, similar, or corresponding elements of the various drawings. The drawings and detailed description are not intended to limit the claimed subject matter to the particular form disclosed. Rather, the intention is to cover all modifications, equivalents, and alternatives falling within the spirit and scope of the claimed subject matter.

DETAILED DESCRIPTION

An embodiment of the disclosed subject matter includes machine 2 useful to produce polyurethane foam within a bag. Machine 2 may is generally of the type described in U.S. Patent Application Publication No. 2012/0261028, which was previously incorporated herein in its entirety by reference. However, as disclosed herein, machine 2 includes novel dispensing system 21, which includes liquid source 26 and liquid dispenser 58, and dispensing system 23, which includes liquid source 24 and liquid dispenser 60. (FIGS. 1-6.)

Figure 1:
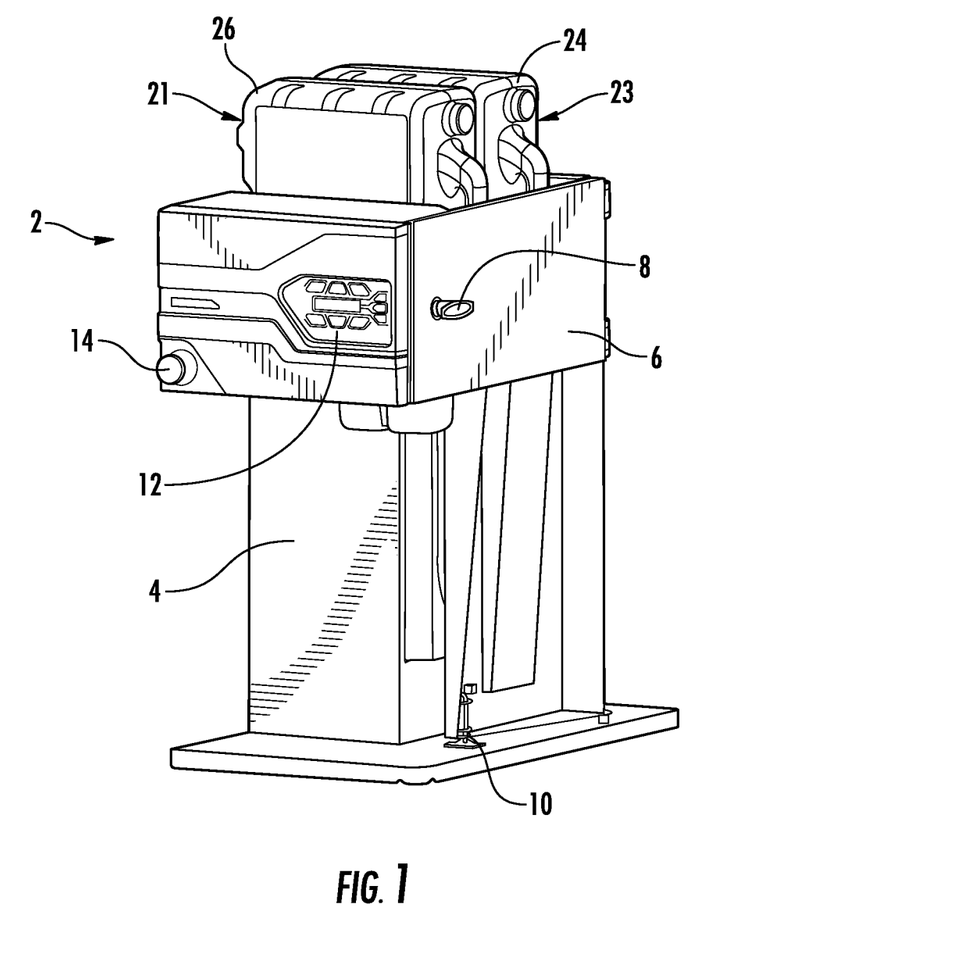
FIG. 1 illustrates a front side perspective view of an embodiment of a machine including a dispensing system of the presently disclosed subject matter.
Figure 2:
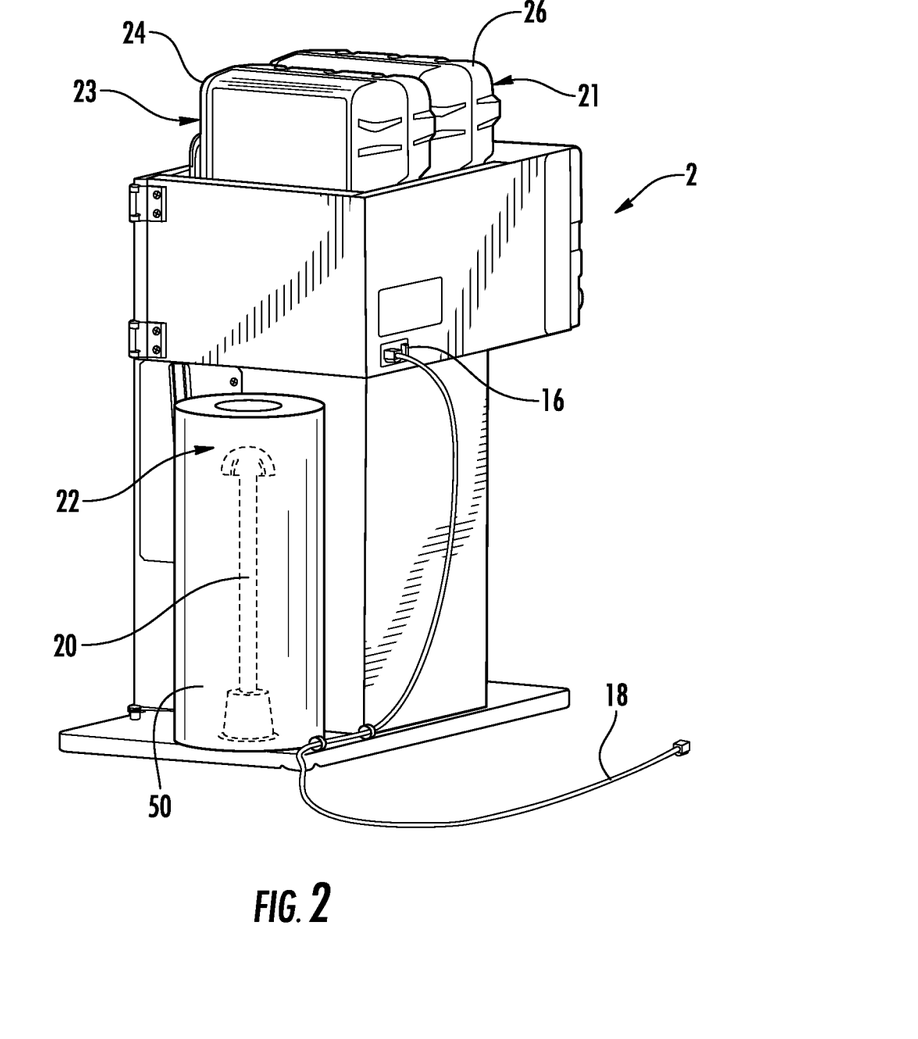
FIG. 2 illustrates a back side perspective view of the machine in FIG. 1.

FIG. 1 illustrates machine 2 for manufacturing foam cushions, the machine including body 4 and door 6. Door 6 includes upper latch 8 and lower latch 10. Control panel 12 provides an interface for controlling the operation of machine. Emergency stop switch 14 is included to stop the operation of machine. Machine 2 includes dispensing system 21, which includes liquid source 26, and dispensing system 23, which includes liquid source 24, as will be discussed in more detail herein. FIG. 2 illustrates machine 2 from the reverse side, showing spindle 20 (shown in dashed lines) for supporting and retaining a roll 22 of bag stock of a series of bags 50 for feeding to the machine. Machine 2 also includes power switch 16 and power cord 18, which may be attached to a power source.

Figure 3:
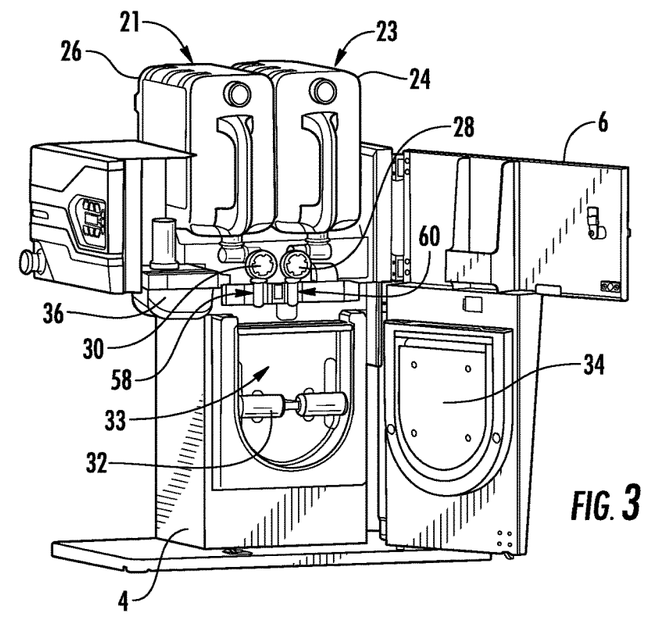
FIGS. 3 and 4 illustrate front side perspective views of the machine in FIG. 1 in an open configuration.

FIG. 3 illustrates machine 2 having door 6 opened to reveal some internal workings. The mixing roller 32 is rotatably mounted on body 4 within the mixing region 33 of machine 2. Mixing pad 34 is provided on the backside of door 6. Mixing roller 32 presses against mixing pad 34 when door 6 is closed. Machine 2 includes dispensing system 21 for dispensing a liquid (e.g., a first foam precursor or isocyanate liquid foam precursor) into a bag 50 within mixing region 33. Machine 2 also includes dispensing system 23 for dispensing a liquid (e.g., a second foam precursor or polyol liquid foam precursor) into the bag 50 within mixing region 33. Dispensing system 21 includes source 26 (e.g., a reservoir or bottle as illustrated) containing first foam precursor. The source 26 is in liquid communication with the dispenser 58. Pump 30 conveys the liquid from source 26 to the dispenser 58. Dispensing system 23 includes source 24 (e.g., a reservoir or bottle as illustrated) containing second foam precursor. The source 24 is in liquid communication with the dispenser 60. Pump 28 conveys the liquid from source 24 to the dispenser 60.

Figure 4:
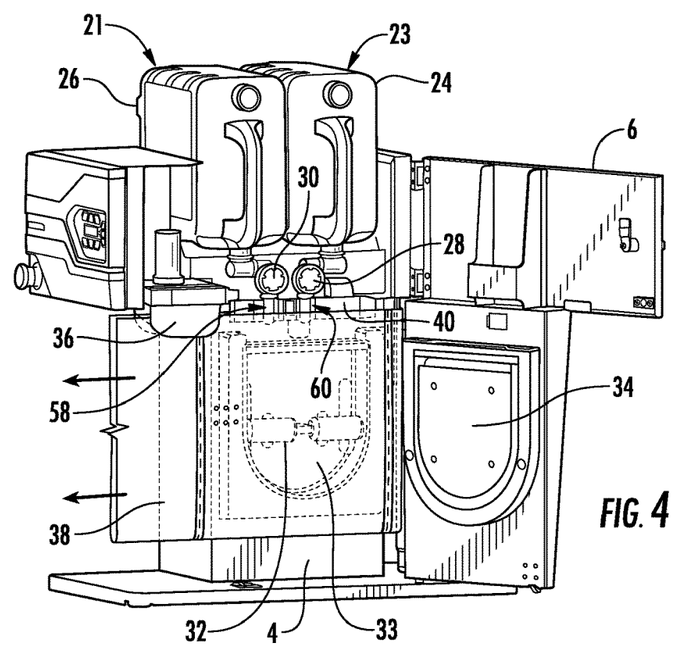

As illustrated in FIG. 4, bag stock 38 is threaded from roll 22 and through a space between body 4 and door 6 of machine 2. Machine 2 further includes drive seal assembly 36, which includes rollers (not visible) that advance bag stock 38 from roll 22 (shown in FIG. 2) and across body 4. Drive seal assembly 36 further includes a seal wire (not visible) that seals the top of bag stock 38 after first foam precursor and second foam precursor have been dispensed into a location between plies of bag stock. Machine 2 further includes film divider 40 that fits between and separates plies of bag stock 38, at the top of bag stock, to aid in dispensing of first foam precursor and second foam precursor between plies of bag stock. Generally, the operation of machine 2 to manufacture the foam-in-bag cushions is similar to that described in U.S. Patent Application Publication No. 2012/0261028A1 (previously incorporated) with respect to machine 300 of that disclosure.

By way of example for the presently disclosed subject matter, the source 26 (such as a container, reservoir or bottle) may supply a liquid that crystallizes upon exposure to water moisture in air, for example a liquid comprising isocyanate, such as one or more of toluene diisocyanate (TDI) and methylene diphenylisocyanate (MDI), all as useful as a first foam precursor to make polyurethane foam in foam-in-place/foam-in-bag packaging. The source 24 (such as a container, reservoir or bottle) may supply a liquid comprising, for example, one or more of: (i) hydroxyl-containing materials, such as polyols (i.e., compounds that contain multiple hydroxyl groups), (ii) water, and optionally (iii) one or more catalysts, foam stabilizers or surfactants, compatibilizers, or other additives (e.g., fragrances, flame retardants, colorants, and viscosity-control agents), all as useful as a second foam precursor to make polyurethane foam upon mixture with the first foam precursor. Useful polyols include, for example, polyether polyols, diols, such as aliphatic diols, and triols.

Such first and second foam precursors are described, for example, in U.S. Pat. No. 6,034,197, which is incorporated herein by reference in its entirety. It is useful to provide first and second foam precursors as a "two-component" system having second foam precursor comprising one or more polyols and water, and first foam precursor comprising one or more isocyanates. It may also be useful for the second foam precursor to further comprise one or more suitable catalysts, surfactants, and any other additives, although one or more of these could be provided as part of first foam precursor, provided there are no significant stability issues.

Useful foam precursors are available having first foam precursor and second foam precursor provided in separate containers, for example, from Sealed Air Corporation under the Ultralite®, Instafill®, Instapak®-40W, Instapak®-50W, Instapak®-75W, Instapak®-Molding Foam, Instapak® FlowRite™, GFlex®, GFlex® QS, Instaflex™, Instapak® Rigid, Instapak® F9401, Instapak® Simply "A" Component, Instapak® SimplyFlex "B" Component, and Instapak® SimplyTuff "B" Component trademarks.

Figure 5:
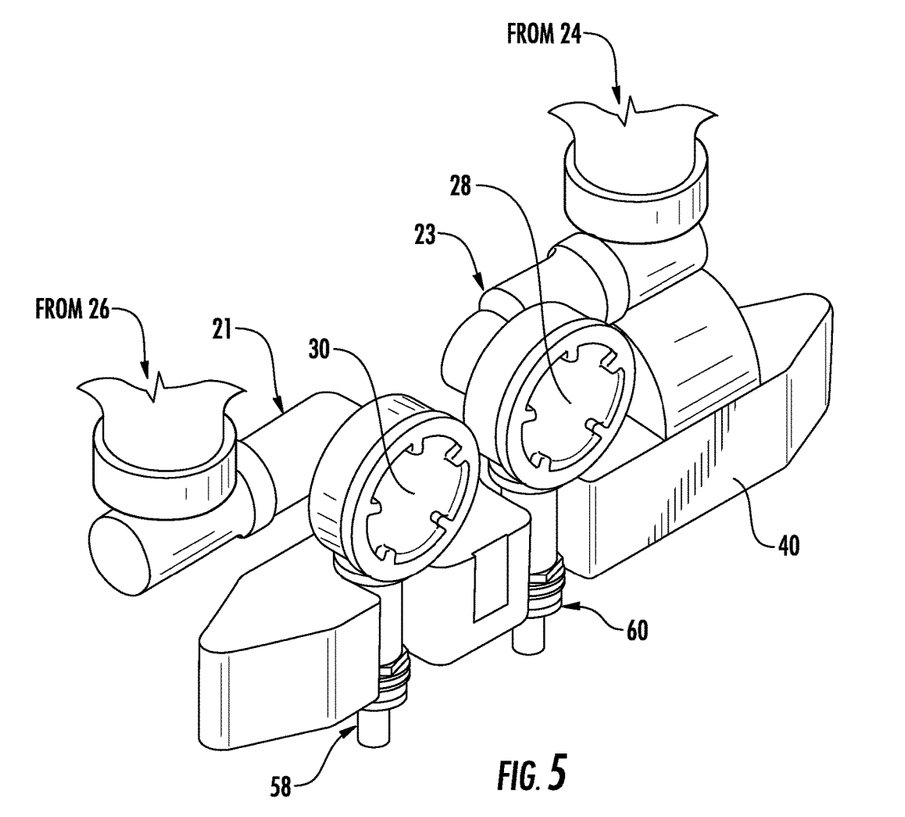
FIG. 5 illustrates a front side perspective view of an embodiment of the dispensing system and a film divider of the machine of FIG. 1.
Figure 6:
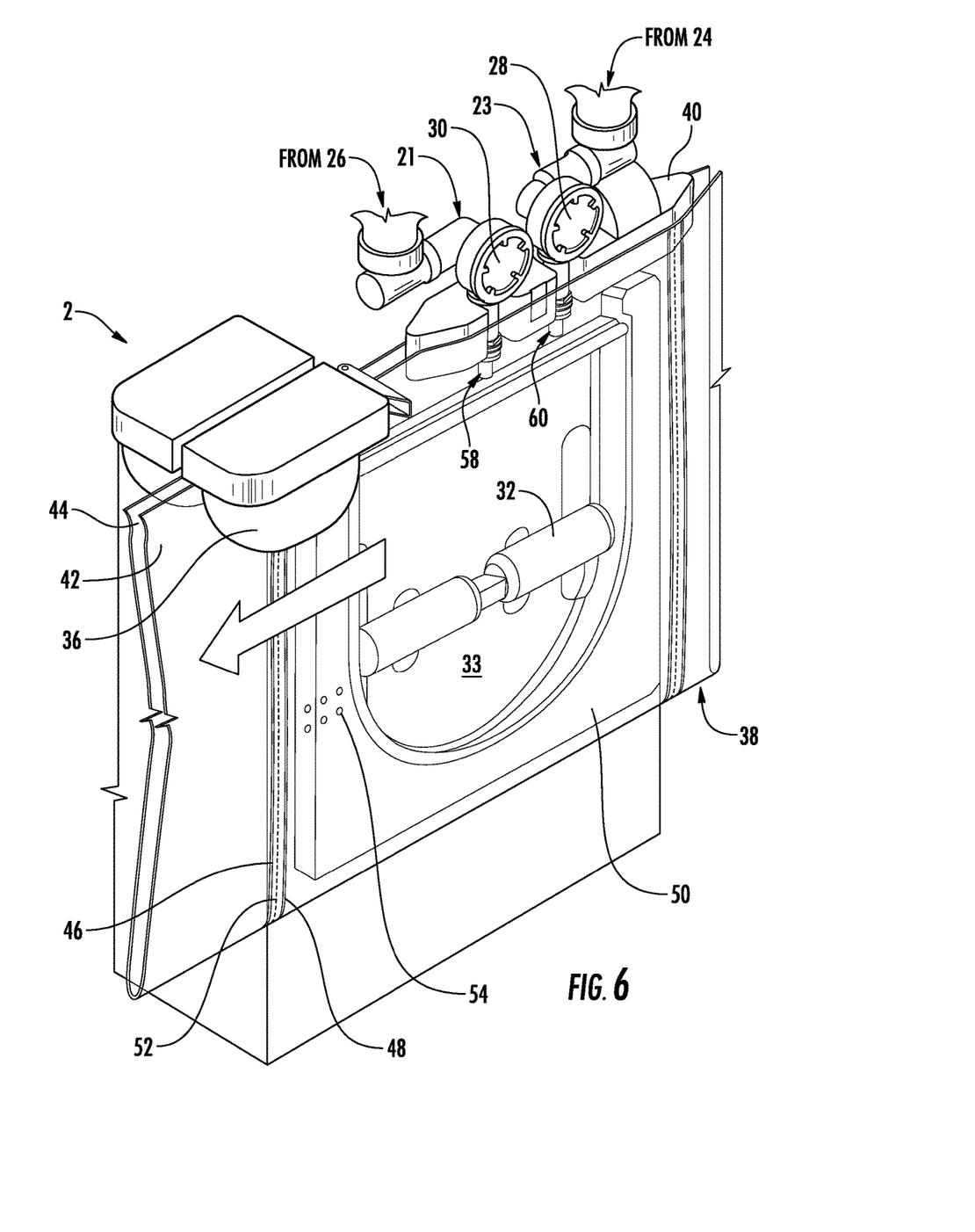
FIG. 6 illustrates a front side perspective view of the dispensing system and film divider of FIG. 5 between plies of bag stock.

FIGS. 5 and 6 illustrate dispensing systems 21 and 23 in more detail. System 21 may include pump 30 for conveying liquid from the source 26 to dispenser 58. System 23 may include pump 28 for conveying liquid from source 24 to dispenser 60. The dispensers 58 and 60 are positioned to extend through film divider 40. FIG. 6 illustrates film divider 40 as incorporated in machine 2, so that the plies of the upper edge of bag stock 38 are divided or separated to open the bag so that the dispensers 58 and 60 extend into the opened bag 50. As a result, the first foam precursor and second foam precursor may be conveyed from the sources 26, 24 respectively by pumps 30, 28 respectively and dispensed to a position (i.e., mixing region 33) between plies of bag stock. When first foam precursor and second foam precursor are in a position between plies of the film, mixing roller 32 rotates to mix first foam precursor and second foam precursor within a region between plies of the bag that is segregated from the remainder portion of the bag. The first foam precursor and second foam precursor react to initiate the formation of polyurethane foam between plies of bag stock 38, which continues to expand within the remainder of the bag as it leaves the machine and the mixture is no longer contained within mixing region 33.

As illustrated in FIG. 6, bag stock 38 includes front and rear plies 42 and 44 of a folded film. Front and rear plies 42 and 44 are sealed together in edge seals 46 and 48 to form and define edge boundaries of the interior of the bag 50. Seals 46 and 48 may be formed by heat sealing the plies together or by applying an adhesive to hold the plies together in the desired regions. A plurality of bags 50 are provided in bag stock 38 and fed off roll 22. Adjoining bags may be separated from adjacent adjoining bags of bag stock. A line of weakening 52 may be formed between adjoining bags, for example, formed between seals 46 and 48, to facilitate detachment of adjoining bags. For example, line of weakening 52 may comprise a plurality of perforations formed between seals 46 and 48. As an alternative to a roll configuration, the plurality of bags may be supplied in a fan-fold stacked arrangement, or may be supplied as independent singular bags.

Bag 50 may comprise one or more vents, for example, vent 54. A suitable vent is designed and/or positioned to provide gas or vapor communication between the interior of the bag and the outside of the bag, while minimizing the communication of foam and/or precursors from the interior of the bag to the exterior of the bag. One or more vents may be positioned in bag 50 to facilitate the flow of by-product gas from the interior of the bag, while minimizing the flow of foam and/or precursors out of the bag 50. For example, FIG. 6 illustrates vent 54 positioned on a portion of bag 50 that is outside of mixing region 33 by closure of pad 34 of door 6. A vent may comprise one or more perforations or slits in the plies of bag 50. A vent may be formed in either the front ply or the rear ply or both of a bag.

The plies 42, 44 of bag stock may comprise materials useful for formation of bag 50, such as polymeric films or fibrous sheets comprising, for example, paper. Useful polymeric films for use in the bag stock may comprise one or more thermoplastic materials selected from polyolefins, for example, polyethylene homopolymers, such as low density polyethylene (LDPE) and high density polyethylene (HDPE), polyethylene copolymers, such as, ionomers, ethylene/vinyl acetate copolymer (EVA), ethylene/(meth)acrylate copolymer (EMA), heterogeneous (e.g., Zeigler-Natta catalyzed) ethylene/alpha-olefin copolymers, homogeneous (e.g., metallocene, single-cite catalyzed) ethylene/alpha-olefin copolymers (e.g., linear low density polyethylene (LLDPE), linear medium density polyethylene (LMDPE), very low density polyethylene (VLDPE), and ultra-low density polyethylene (ULDPE)), polypropylene homopolymer, polypropylene copolymer (e.g., propylene/ethylene copolymer), polyesters, polystyrenes, polyamides, and polycarbonates. The polymeric film of the bag stock may be monolayer or multilayer, for example, a three-layer film having a sealant layer, a core layer, and an outer abuse layer. The film of the bag stock may be made by film-forming methods known in the art, such as coextrusion and lamination.

Useful bag stock material is available, for example, from Sealed Air Corporation in a centerfolded roll configuration under the SpeedyPacker® silver SP19 and SP30 trademarks. Bag stock material available as a roll of converted three-sided bags—having the transverse sides formed by heat seals with perforations through the seals, one longitudinal side formed by a centerfold, and the other longitudinal side open—is available, for example, from Sealed Air Corporation under the Instapacker® Tabletop white IP16 and IP24 trademarks. In addition, bag stock material is available, for example, from Sealed Air Corporation under the Instapak® Simple 16" Film, Instapak® Simple 24" Film, Instapak® Simple 40 cm Film, and Instapak® Simple 60 cm Film trademarks.

Figure 7:
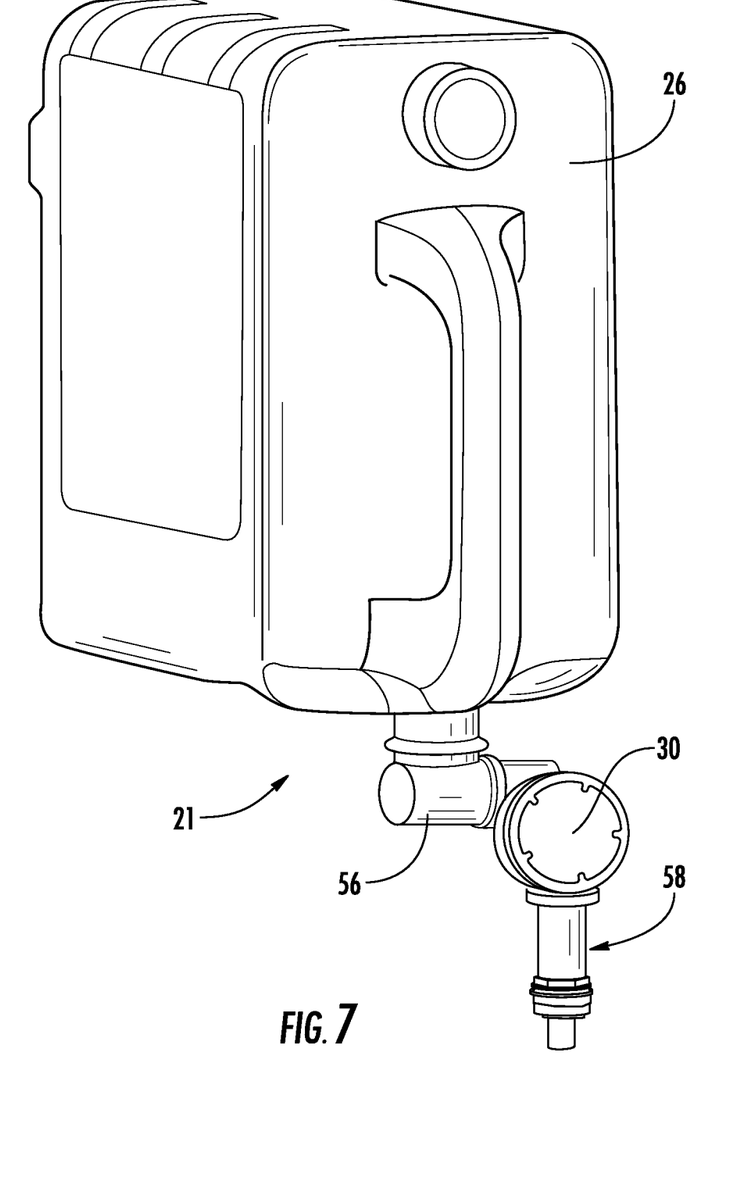
FIG. 7 illustrates a front side perspective view of the dispensing system 21 of the machine of FIG. 1 including source 26, pump 30, and dispenser 58.

FIG. 7 illustrates dispensing system 21 of the presently disclosed subject matter. Dispenser 58 is in liquid communication with source 26, so that the liquid contained within supply 26 may be conveyed to the dispenser 58. As illustrated, source 26 is connected in liquid communication to elbow conduit 56, which in turn is connected in liquid communication to the inlet of pump 30. The outlet of pump 30 is connected in liquid communication to dispenser 58. Pump 30 is configured to convey the liquid from source 26.

Because the components of dispensing system 23 of machine 2 may be selected to generally mirror the components of dispensing system 21, for the sake of brevity system 23 is not described in further detail beyond that disclosed for dispensing system 21. As previously noted, one of the dispensing systems dispenses a first liquid foam precursor and the other dispensing system dispenses a second liquid foam precursor.

The pump 30 is selected to convey the liquid foam precursor from the corresponding source 26 of liquid (e.g., a container, bottle or reservoir) to the corresponding dispenser 58. The pump 30 may be selected from, for example, one or more of any of a geroter pump, an internal gear pump, a screw pump, a shuttle block pump, a flexible vane pump, a sliding vane pump, a circumferential piston pump, a flexible impeller pump, a piston pump, a diaphragm pump, a plunger pump, a centrifugal pump, and a peristaltic pump. Pumps 28 and 30 are illustrated in the drawings as a geroter pump; however, any type of pump (e.g., any of the aforementioned pumps) that is appropriate for pumping the associated liquid (e.g., liquid 70) may be used.

Figure 8:
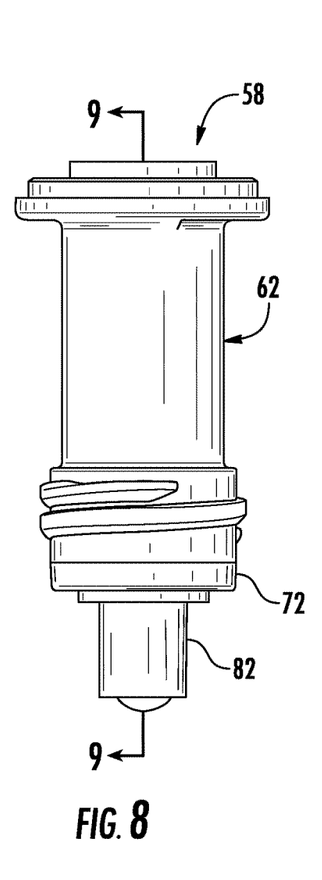
FIG. 8 illustrates a enlarged side elevational view of the dispenser 58 of FIGS. 3 to 7.
Figure 9:
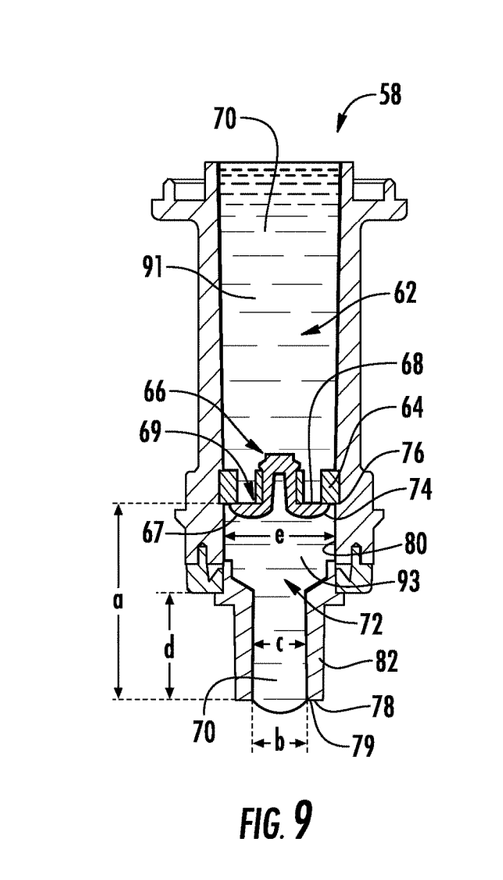
FIG. 9 illustrates a side elevational sectional view the dispenser 58 of FIG. 8, taken along line 9-9 of FIG. 8.
Figure 10:
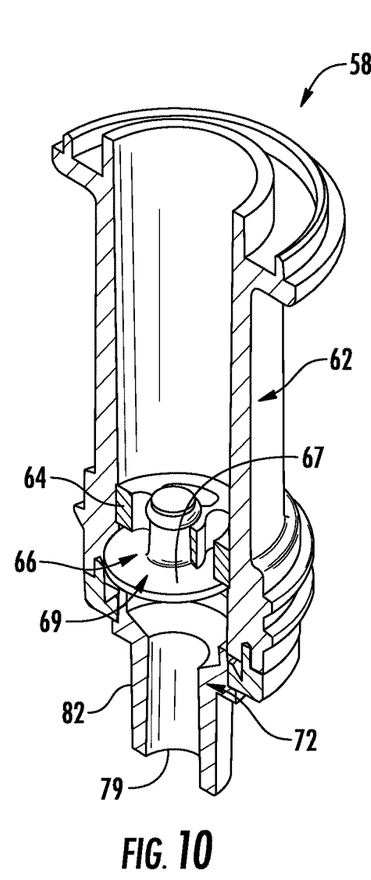
FIG. 10 illustrates a perspective view of a cross section of the dispenser 58 in FIG. 8.

FIGS. 8-10 illustrate dispenser 58 of dispensing system 21 of machine 2 in more detail. Dispenser 58 is in liquid communication with liquid source 26. Dispenser 58 includes inlet conduit 62 for receiving the liquid 70 from the liquid source 26, an outlet conduit 72 for dispensing the liquid 70, and a valve 66 between the inlet and outlet conduits 62, 72. The outlet conduit 72 terminates in an outlet opening 79, which is exposed to air.

Valve 66 has an upstream side 68 adjacent the inlet conduit 62 and a downstream side 74 adjacent the outlet conduit 72. Valve 66 is moveable between an open position (not illustrated), in which the liquid 70 flows through the valve 66, and a closed position 69, in which the liquid 70 is blocked from flowing through the valve 66. In the open position of the valve 66 the liquid 70 flows from the inlet conduit 62 and out of the outlet opening 79 of the outlet conduit 72. In the closed position 69 of the valve 66, an upstream portion 91 of the liquid 70 is retained in the inlet conduit 62 on the upstream side 68 of the valve 66. Also in the closed position 69 of the valve 66, a downstream portion 93 of the liquid 70 extending from the downstream side 74 of the valve 66 to the outlet opening 79 is retained in the outlet conduit 72 on the downstream side 74 of the valve 66.

The size of the outlet opening 79 of the outlet conduit 72 is sufficiently small to retain the downstream portion 93 of the liquid 70 in the outlet conduit 72 when the valve 66 is in the closed position 69. In such case, the valve 66 is immersed in the liquid 70 by virtue of the liquid 70 being on both the upstream side 68 and the downstream side 74 of the valve, thus precluding an interface between the liquid 70 and air (and the water moisture contained in the air) from forming in the vicinity of the valve 66.

The maximum size of the outlet opening 79 of the outlet conduit 72 is selected to be sufficient small that the downstream portion (or "slug") 93 of the liquid 70 is retained within the outlet conduit 72 so that the liquid does not drip or drain from the outlet conduit 72 to expose valve 66 to air when valve 66 is closed. Such maximum size of the opening depends for the most part (for practical purposes) on the surface tension of the liquid 70, the density of the liquid 70, and the shape of the outlet conduit and opening 79.

The maximum size "w" of the outlet opening 79 that will retain the downstream portion 93 of liquid 70 within the outlet conduit 72 may be approximated by the following formula:

$$w=2(zy/g\rho)^{(1/2)}$$

where "w" is the width of the outlet opening in meters, "z" is a shape coefficient (unitless), "γ" (gamma) is the surface tension of the liquid in Newtons per square meter (N/m$^2$), "ρ" (rho) is the density of the liquid in kilograms per square meter (kg/m$^3$), and "g" is the standard gravity 9.81 m/s$^2$.

When the outlet opening 79 has a circular cross-section, as illustrated in FIGS. 8 to 10, the shape coefficient "z" may be approximated by 9/4, which is a coefficient value useful for modeling drop formation for the liquid from a circular conduit (i.e., the change in shape from inside the conduit to a droplet). In the formula, "w" then becomes "d" (i.e., the internal diameter of the outlet opening 79), such that the maximum internal diameter "d" of the outlet opening 79 may be approximated by the following formula:

$$d=2(9\gamma/4g\rho)^{(1/2)}$$

where "d" is the internal diameter of the outlet opening in meters, "γ" is the surface tension of the liquid in N/m$^2$, "ρ" is the density of the liquid in kg/m$^3$, and "g" is the standard gravity 9.81 m/s$^2$.

Where the outlet opening and/or outlet conduit does not have a circular cross-section, then the determination of the shape coefficient for the approximation of the maximum width depends on the actual cross-sectional shape and would be determined by one of skill in the art empirically and/or by calculation without undue experimentation in view of the guidance provided herein.

As is known by those of skill in the art, the density and surface tension of the liquid 70 may be determined under appropriate test methods. For example, density can be calculated after measuring the specific gravity of the liquid (using the known density of water at a specific temperature as the reference), which follows ASTM standard D891-09 (hydrometer method, Test Method A 1.1.1). The measurement of the surface tension of liquid 70 may be taken according to ASTM D1331-14 (Test Method A).

For example, for a liquid 70 comprising isocyanate, the density of the liquid may be about 1240 kg/m3 and the surface tension may be about 0.05 N/m. Using the above formulation, and these values, the maximum diameter of the outlet opening that would retain the liquid comprising isocyanate in the outlet conduit is about 0.006 meters.

The maximum internal diameter of the outlet opening 79 of the outlet conduit may be, for example, no more any of following: 0.008, 0.007, 0.0065, 0.006, and 0.005 meters. The minimum internal diameter of the outlet opening 78 may be that which is practical to allow liquid flow at a desired speed, for example, at least any one of the following diameters: 0.001, 0.002, 0.004, and 0.005 meters/

Figure 16:
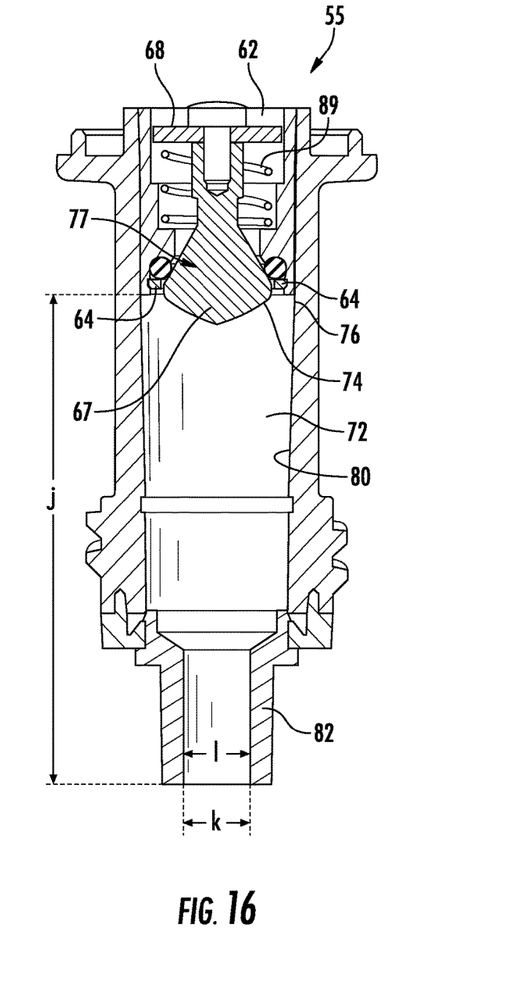
FIG. 16 illustrates a side sectional elevational view of the dispenser 55 of FIG. 15, taken along line 16-16 of FIG. 15.

The valve 66 includes disc (or valve member) 67, which seats against valve seat 64 to close the valve, and which is spaced apart from the valve seat 64 to open the valve. The type of disc 67 will depend upon the type of valve used. For example, for an umbrella valve as illustrated in FIGS. 8-12, the disc may be a flap or diaphragm. For a plug valve, the disc is a plug. For a needle valve, the disc is a stem point or tip. For a ball valve, the disc is a ball. For a poppet valve, the disc may be a tapered plug. (FIG. 16.) While the embodiments illustrated in FIGS. 8-14 include an umbrella valve, any type of valve suitable for liquid 70 and the dispenser (e.g., an umbrella valve, a poppet valve, a needle valve) may be used.

Inlet conduit 62 may be in liquid communication with outlet of a pump (not illustrated in FIGS. 8-12) to convey the liquid 70 from the source 26 to the inlet conduit 62. An internal cavity or channel exists within inlet conduit 62, and valve 66 may be positioned at the bottom of the cavity of inlet conduit 62. If a pump pressurizes liquid 70 to contact the upstream side 68 of valve 66 such that the pressure on the upstream side exceeds a given level sufficient to open the valve, then the valve opens and liquid passes through the valve. As illustrated in FIGS. 8-12, valve 66 comprises a disc 67 comprising a flexible diaphragm configured to open the valve 66 (move from the seat 64) when the pressure on the upstream side of the valve exceeds a given level. If pump does not pressurize liquid 70 against upstream side 68 of valve 66 above the given level such that the pressure is not high enough to open valve 66, then liquid 70 rests against the upstream side 68 of valve 66 but the valve remains closed with the upstream side of valve remaining covered by liquid 70. Outlet conduit 72 is positioned on the downstream side 74 of valve 66. Outlet conduit 72 is in liquid communication with valve 66. Outlet conduit 72 includes proximate end 76 positioned adjacent to downstream side 74 of valve 66. Outlet conduit further includes distal end 78 spaced apart from the downstream side of valve 66. Liquid 70 may be dispensed from distal end 78 through the outlet opening 79. When valve 66 is open, outlet conduit 72 permits liquid 70 to flow from the proximate end 76 to the distal end 78 and out the outlet opening 79.

When valve 66 is closed, outlet conduit 72 retains downstream portion 93 of liquid 70 within the outlet conduit 72 and against downstream side 74 of valve 66. Liquid 70 may remain in outlet conduit 72 when valve 66 is closed, without dripping out of the outlet opening, because of the factors described above (including the surface tension and density of liquid 70 and the size of the outlet opening). Therefore, when valve 66 is closed, both upstream side 68 and downstream side 74 of valve remain in contact with (i.e., immersed in) liquid 70. The liquid 70 contacts the air (and moisture therein) at the outlet opening 79 at the distal end 78 of outlet conduit 72 so that crystallization of liquid 70 does not occur in the region of valve 66.

The outlet conduit of any of the dispensing systems disclosed herein may have a length from the downstream side of the valve to the outlet opening. The outlet conduit length may range from 0.002 meters to 0.5 meters or from 0.002 meters to 0.2 meters. The outlet conduit length may be at most any of the following lengths: 0.5, 0.2, 0.1, 0.08, 0.05, and 0.03 meters; and at least any of the following lengths: 0.002, 0.005, 0.008, 0.01, and 0.02 meters.

The inner diameter of proximate end 76 of outlet conduit 72 may be larger than the inner diameter of the distal end 78 of the outlet conduit 72 (i.e., the inner diameter of the outlet opening). Outlet conduit 72 may comprise nozzle 82.

Exemplary details of the dispenser 58 as illustrated in FIG. 9 include the following. Nozzle 82 may be constructed of high density polyethylene. Flexible disc 67 of valve 66 may comprise Viton® FKM elastomer (available from E. I. du Pont de Nemours and Company). Outlet conduit 72 may have a total length "a" from the downstream side 74 to the outlet opening 79 of 2.06 cm. Outlet opening 79 may have an internal diameter of "b" of 0.597 cm. The opposing sides of the inner wall of nozzle 82 may have a sum of outward flaring "c" of 2° (each opposing side being flared outward 1° from a longitudinal axis of nozzle). Nozzle 82 may includes tip length "d" of 1.12 cm. The inner diameter "e" of proximate end 76 of outlet conduit 72 may be 1.19 cm.

As another example for the exemplary dimensions of dispenser 58, outlet conduit 72 may have a total length "a" from the downstream side 74 to the outlet opening 79 of 1.83 cm. Outlet opening 79 may have an internal diameter of "b" of 0.597 cm. The opposing sides of the inner wall of nozzle 82 may have a sum of outward flaring "c" of 2° (each opposing side being flared outward 1° from a longitudinal axis of nozzle). Nozzle 82 may includes tip length "d" of 1.11 cm. The inner diameter "e" of proximate end 76 of outlet conduit 72 may be 1.30 cm.

Figure 11:
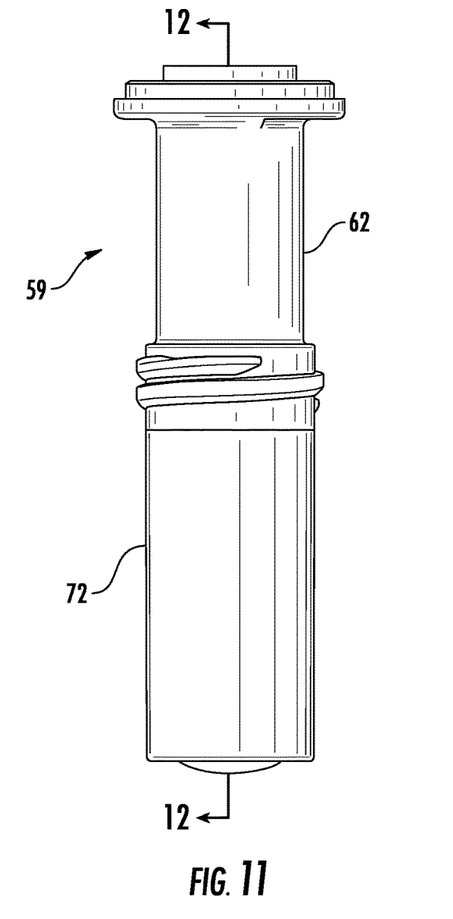
FIG. 11 illustrates a side elevational view of an embodiment of a dispenser of the presently disclosed subject matter.
Figure 12:
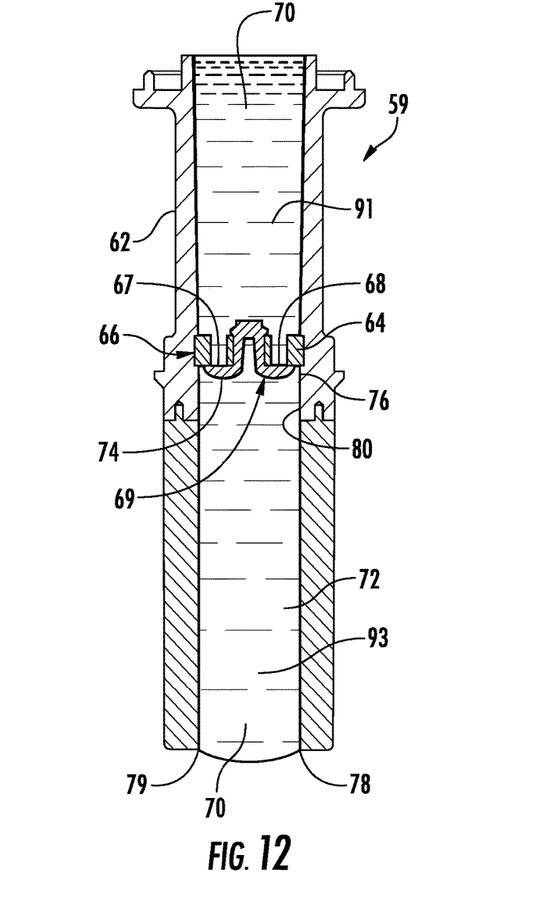
FIG. 12 illustrates a side elevational sectional view of the dispenser 59 of FIG. 11, taken along line 12-12 of FIG. 11.

FIGS. 11 and 12 illustrate alternative embodiment dispenser 59, which is similar to dispenser 58, except that dispenser 59 includes outlet conduit 72 comprising a uniform diameter between proximate 76 and distal end 78. Liquid 70 is retained against downstream side 74 of valve 66, and maintained in contact with upstream side 68 of valve 66, when valve 66 is closed.

Figure 13:
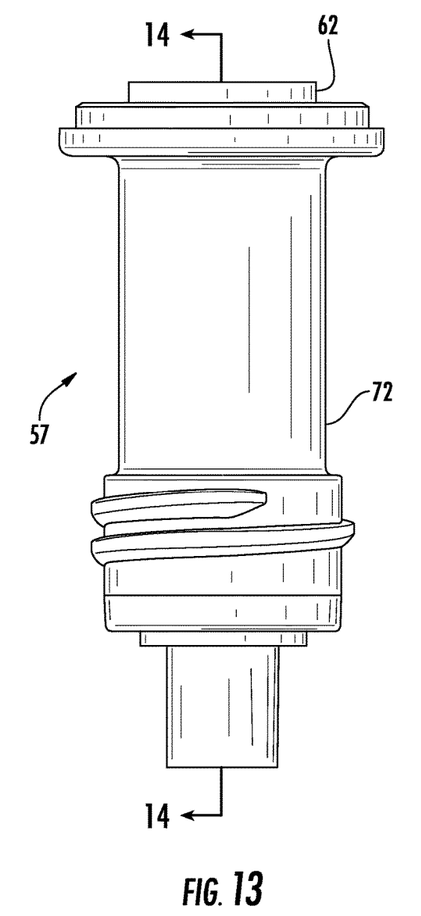
FIG. 13 illustrates a side elevational view of an embodiment of a dispenser of the presently disclosed subject matter.
Figure 14:
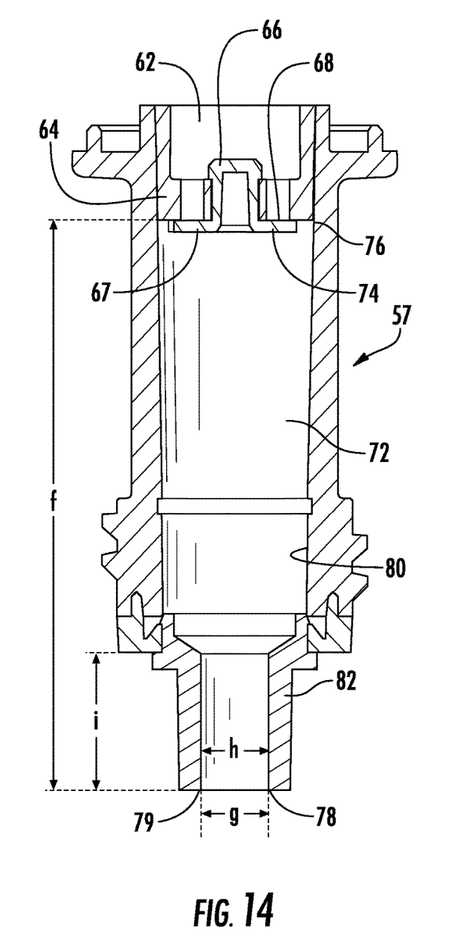
FIG. 14 illustrates a side elevational sectional view of the dispenser 57 in FIG. 13, taken along line 14-14 of FIG. 13.

FIGS. 13 and 14 illustrate alternative embodiment dispenser 57, which is similar to dispenser 58 except, for example, the dimensions. Outlet conduit 72 includes a total length "f" taken from the downstream side 74 to the outlet opening 79 of 4.65 cm. Outlet opening 79 has an internal diameter of 0.597 cm. Opposing sides of an inner wall of nozzle 82 have a sum of outward flaring "h" of 2° (each opposing side being flared outward 1° from a longitudinal axis of nozzle). Nozzle 82 includes tip length "i" of 1.12 cm.

Figure 15:
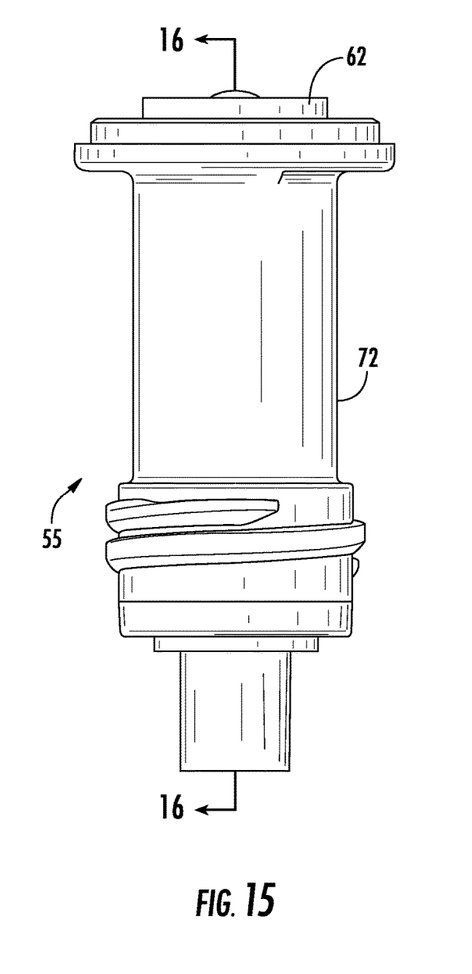
FIG. 15 illustrates a side elevational view of an embodiment of a dispenser of the presently disclosed subject matter.

FIGS. 15 and 16 illustrate alternative embodiment dispenser 55, which is similar to dispenser 58 except that dispenser 55 includes poppet valve 77. The exemplary features of dispenser 55 includes the following. Valve 77 comprises high density polyethylene poppet valve including a stainless steel spring 89. Outlet conduit 72 includes a total length "j" of 4.04 cm. Outlet opening 79 has an internal diameter of 0.597 cm. Opposing sides of an inner wall of nozzle 82 have a sum of outward flaring "l" of 2° (each opposing side being flared outward 1° from a longitudinal axis of nozzle 82.

The embodiments of the dispenser that are illustrated in FIGS. 8-16 may be used as a dispenser for first foam precursor and/or the second foam precursor.

The dispenser, as disclosed herein, allows liquid 70 to be maintained on the upstream and downstream sides of the valve (i.e. the valve may be maintained in a column of liquid 70 and not exposed to air). When a dispenser, as disclosed herein, is connected to a supply of foam precursor, the valve is not exposed to air during the time that is required to deplete a supply of foam precursor. By maintaining the liquid foam precursor 70 against upstream and downstream sides of the valve when the valve is closed, air is prevented from contacting the valve, and the chance crystallization of the foam precursor against the valve or in a valve assembly is reduced. The crystallization of the foam precursor may preferentially occur near the distal end outlet opening 79 of the outlet conduit 72, but does not contact the valve due to the spacing that is provided between the distal end of the outlet conduit and the valve. Any crystallization of the foam precursor that may occur at the distal end of the outlet conduit may be removed (e.g., cleaned) without requiring the valve to be cleaned. Furthermore, after cleaning crystals from the distal end of the outlet conduit, the pump may be returned to its prior (baseline) efficiency. In addition, the low back pressure of an outlet conduit allows for high pumping efficiency and consistency across a wider range of temperatures compared previous dispensing constructions. The embodiments above diminish the formation of crystals on a valve or in a valve assembly, and thereby reduce unwanted leakage or dripping of liquid, by maintaining liquid coverage on both sides of the valve.

The outlet conduit 72 may be constructed of a flexible hose and have dimensions and properties sufficient to allow a liquid foam precursor 70 to be retained against the downstream side of the valve regardless of whether the hose is flexed in a non-linear shape. In addition, the outlet conduit may not need to oriented vertically in order to retain the liquid against the downstream side of the valve when the valve is closed.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A system for dispensing a liquid, the system comprising:
   a source of a liquid that crystallizes upon exposure to water moisture in air; and
   a dispenser in liquid communication with the source, the dispenser comprising:
      an inlet conduit for receiving the liquid from the source;
      an outlet conduit for dispensing the liquid, the outlet conduit terminating in an outlet opening exposed to air; and
      a valve between the inlet and outlet conduits, the valve having an upstream side adjacent the inlet conduit and a downstream side adjacent the outlet conduit;

wherein the valve is moveable between an open position, in which the liquid flows through the valve, and a closed position, in which the liquid is blocked from flowing through the valve;

wherein, in the open position of the valve, the liquid flows from the inlet conduit and out the outlet opening of the outlet conduit;

wherein, in the closed position of the valve, (i) an upstream portion of the liquid is retained in the inlet conduit on the upstream side of the valve and (ii) a downstream portion of the liquid extending from the downstream side of the valve to the outlet opening is retained in the outlet conduit on the downstream side of the valve; and wherein the size of the outlet opening of the outlet conduit is selected to retain the downstream portion of the liquid in the outlet conduit when the valve is in the closed position, whereby the valve is immersed in the liquid and the liquid does not drip from the outlet conduit.

2. The system of claim 1 wherein the outlet opening has an internal diameter that is no more than the value determined by the equation:

$$d = 2\sqrt{\frac{9\gamma}{4g\rho}}$$

where "d" is the internal diameter of the outlet opening, "$\gamma$" is the surface tension of the liquid, "$\rho$" is the density of the liquid, and "g" is the standard gravity.

3. The system of claim 1 wherein the internal diameter of the outlet opening is no more than 0.008 meters.

4. The system of claim 1 wherein the internal diameter of the outlet opening is no more than 0.007 meters.

5. The system of claim 1 wherein the internal diameter of the outlet opening is no more than 0.0065 meters.

6. The system of claim 1 wherein the internal diameter of the outlet opening is no more than 0.006 meters.

7. The system of claim 1 wherein the outlet conduit defines a proximate end adjacent the downstream side of the valve, the proximate end having an internal diameter that is larger than the internal diameter of the outlet opening of the outlet conduit.

8. The system of claim 1 wherein the outlet conduit has a length from the downstream side of the valve to the outlet opening, the outlet conduit length ranging from 0.002 meters to 0.5 meters.

9. The system of claim 8 wherein the outlet conduit length ranges from 0.002 meters to 0.2 meters.

10. The system of claim 1 further comprising a pump to convey the liquid from the source to the inlet conduit of the dispenser.

11. The system of claim 10 wherein the pump is downstream from the source of the liquid and upstream from the valve.

12. The system of claim 10 wherein the pump comprises a geroter pump.

13. The system of claim 1 wherein the valve comprises a disc comprising a flexible diaphragm configured to open the valve when the pressure on the upstream side of the valve exceeds a given level.

14. The system of claim 1 wherein the source comprises a reservoir of the liquid.

15. The system of claim 1 wherein the liquid comprises a foam precursor.

16. The system of claim 15 wherein the foam precursor comprises an isocyanate.

17. The system of claim 1 wherein a portion of the inlet conduit and a portion of the outlet conduit are formed from a single, unitary component.

18. The system of claim 17 wherein the valve comprises a valve seat that is fixedly coupled to the single, unitary component.

19. The system of claim 18, wherein the valve further comprises a valve member configured to seat against the valve seat.

20. A dispenser for dispensing a liquid that crystallizes upon exposure to water moisture in air, the dispenser comprising:
an inlet conduit for receiving the liquid;
an outlet conduit for dispensing the liquid, the outlet conduit terminating in an outlet opening exposed to air; and
a valve between the inlet and outlet conduits, the valve having an upstream side adjacent the inlet conduit and a downstream side adjacent the outlet conduit;
wherein the valve is moveable between an open position, in which the liquid flows through the valve, and a closed position, in which the liquid is blocked from flowing through the valve;
wherein, in the open position of the valve, the liquid flows from the inlet conduit and out the outlet opening of the outlet conduit;
wherein, in the closed position of the valve, (i) an upstream portion of the liquid is retained in the inlet conduit on the upstream side of the valve and (ii) a downstream portion of the liquid extending from the downstream side of the valve to the outlet opening is retained in the outlet conduit on the downstream side of the valve; and
wherein the size of the outlet opening of the outlet conduit is selected to retain the downstream portion of the liquid in the outlet conduit when the valve is in the closed position, whereby the valve is immersed in the liquid and the liquid does not drip from the outlet conduit.

* * * * *